United States Patent
Gopalakrishnan et al.

(10) Patent No.: US 11,005,585 B1
(45) Date of Patent: May 11, 2021

(54) TRANSPORTING CLIENT TIMING INFORMATION ACROSS A NETWORK

(71) Applicant: Juniper Networks, Inc., Sunnyvale, CA (US)

(72) Inventors: Kamatchi S. Gopalakrishnan, Dublin, CA (US); Rajagopalan Subbiah, San Jose, CA (US); Julian Kazimierz Lucek, Ipswich (GB)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/778,363

(22) Filed: Jan. 31, 2020

Related U.S. Application Data

(60) Provisional application No. 62/955,938, filed on Dec. 31, 2019.

(51) Int. Cl.
*H04J 3/06* (2006.01)

(52) U.S. Cl.
CPC .................. *H04J 3/0667* (2013.01)

(58) Field of Classification Search
CPC .......... H04J 3/06; H04J 3/0635; H04J 3/0638; H04J 3/0644; H04J 3/0647; H04J 3/0667; H04J 3/065; H04J 3/0658; H04J 3/0661; H04J 3/0673
See application file for complete search history.

(56) References Cited

U.S. PATENT DOCUMENTS

| | | | | |
|---|---|---|---|---|
| 6,697,382 B1 * | 2/2004 | Eatherton | ............. | H04J 3/0632 370/503 |
| 6,970,935 B1 * | 11/2005 | Maes | ................ | H04L 29/06027 370/356 |
| 8,462,821 B1 * | 6/2013 | Sagarwala | ............ | H04J 3/0658 370/508 |
| 2002/0080829 A1 * | 6/2002 | Ofek | ....................... | H04L 47/22 370/539 |
| 2005/0226204 A1 * | 10/2005 | Uehara | ................. | H04W 99/00 370/349 |

(Continued)

FOREIGN PATENT DOCUMENTS

| | | |
|---|---|---|
| EP | 2530860 A1 | 12/2012 |
| EP | 2541815 A1 | 1/2013 |

OTHER PUBLICATIONS

Editor., et al., "Draft G.8264 (G.pacmod) V0.3 (for consent)", 3GPP draft 487R1, Mar. 18, 2008, vol. RAN WG3 (Shenzhen), 32 pages, XP050163788.

(Continued)

*Primary Examiner* — Kevin D Mew
(74) *Attorney, Agent, or Firm* — Harrity & Harrity, LLP

(57) ABSTRACT

A network device may receive a timing control packet from a first client device. The network device may determine that the network device is in a synchronized state relative to a network grandmaster clock. The network device may modify a first field of a header of the timing control packet to indicate that the network device is in a synchronized state. The network device may modify a second field of the header of the timing control packet to indicate a time at which the network device received the timing control packet from the first client device. The network device may forward, via the network, the timing control packet toward a second client device.

20 Claims, 13 Drawing Sheets

(56) References Cited

U.S. PATENT DOCUMENTS

| | | | | |
|---|---|---|---|---|
| 2007/0115814 A1* | 5/2007 | Gerla | | H04L 47/25 370/230 |
| 2007/0237177 A1* | 10/2007 | Endo | | H04Q 11/0071 370/468 |
| 2008/0056307 A1* | 3/2008 | DeCusatis | | H04J 3/0647 370/503 |
| 2008/0181114 A1* | 7/2008 | Fourcand | | H04L 47/2408 370/235 |
| 2010/0040369 A1* | 2/2010 | Zhao | | H04J 3/0673 398/58 |
| 2010/0118721 A1* | 5/2010 | Sakurada | | H04L 12/422 370/252 |
| 2011/0093609 A1* | 4/2011 | Blom | | H04L 63/0428 709/231 |
| 2011/0305307 A1* | 12/2011 | Wang | | H04L 45/00 375/362 |
| 2015/0093109 A1* | 4/2015 | Joergensen | | H04J 14/02 398/45 |
| 2017/0324497 A1* | 11/2017 | Ruffini | | H04L 45/02 |
| 2018/0337833 A1 | 11/2018 | Attarwala | | |
| 2020/0099734 A1* | 3/2020 | Sun | | H04J 3/0697 |
| 2020/0267673 A1* | 8/2020 | Joseph | | H04W 76/10 |

OTHER PUBLICATIONS

Extended European Search Report for Application No. EP20165152. 8, dated Sep. 28, 2020, 7 pages.

Pallec M.L., et al., "Time and Frequency Distribution Over Packet Switched Networks", Bell Labs Technical Journal, Jul. 1, 2009, vol. 14 (2), pp. 131-153.

"IEEE Standard for a Precision Clock Synchronization Protocol for Networked Measurement and Control Systems," IEEE Instrumentation and Measurement Society, IEEE Std 1588™-2008, Jul. 24, 2008 (Downloaded Sep. 29, 2010), pp. 1-269.

* cited by examiner

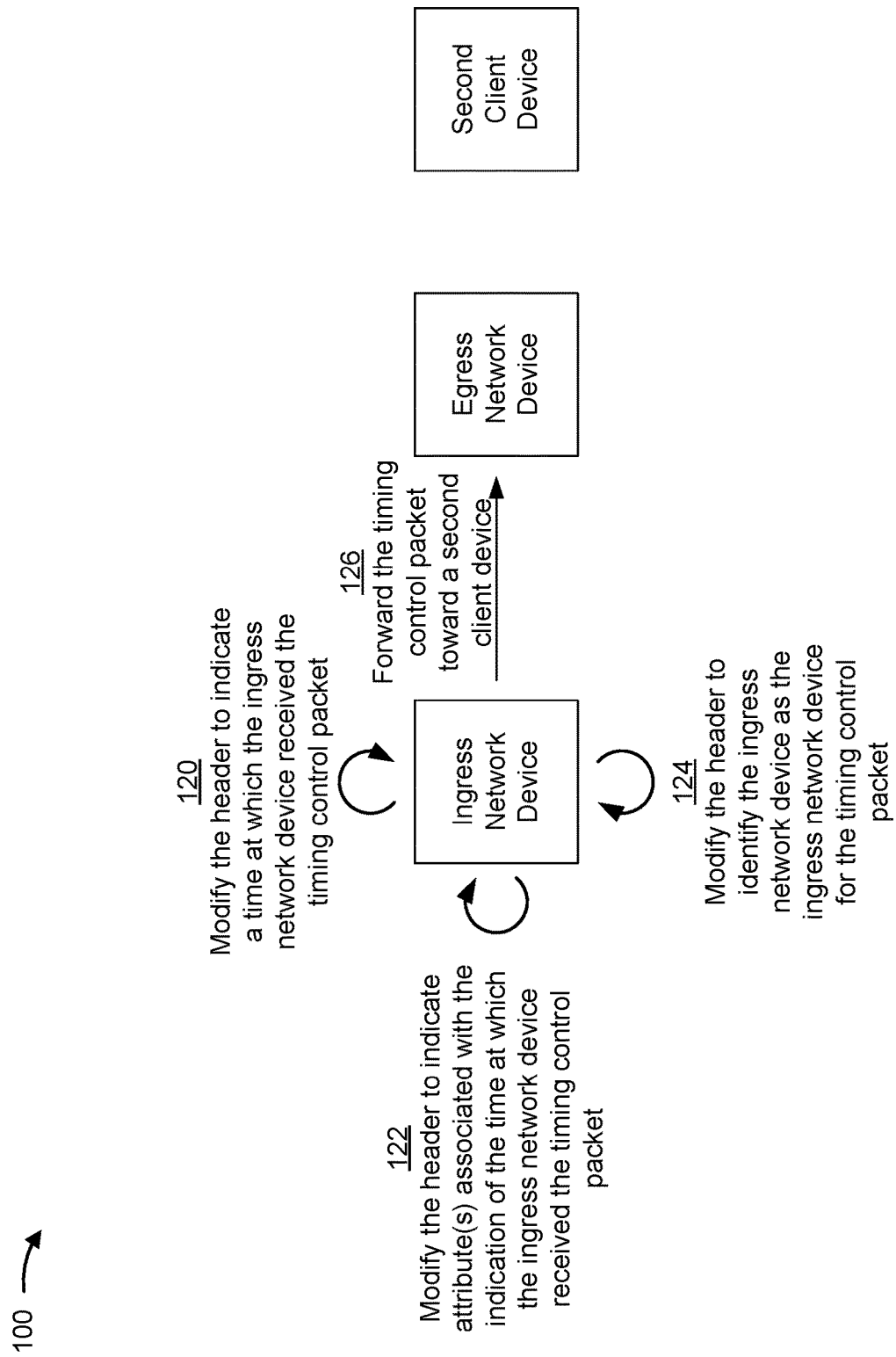

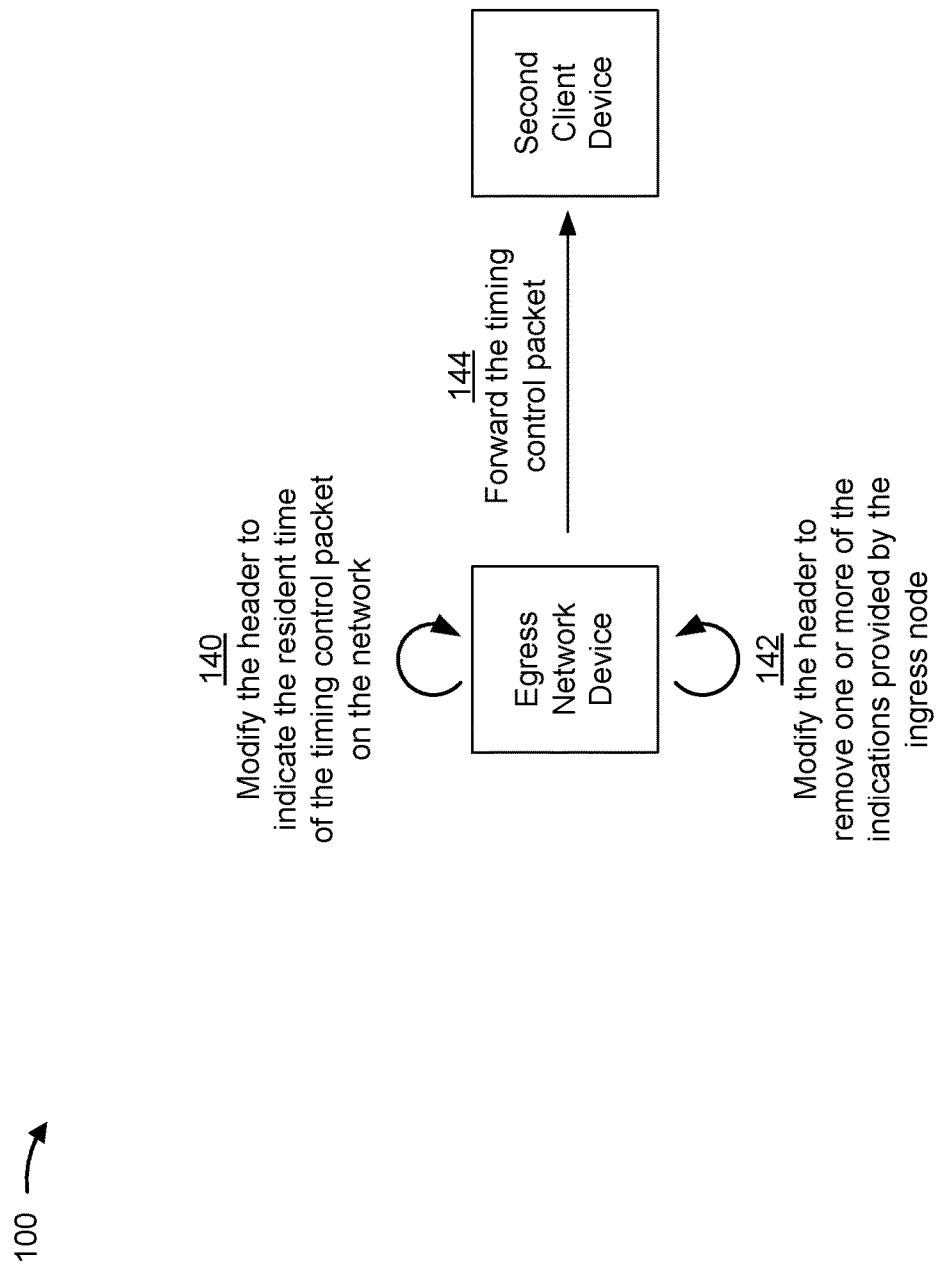

| PTP Message Header Format | | | | | | | | | |
|---|---|---|---|---|---|---|---|---|---|
| Bits | | | | | | | | Octets | Offset |
| 7 | 6 | 5 | 4 | 3 | 2 | 1 | 0 | | |
| transportSpecific | | | | | messageType | | | 1 | 0 |
| Reserved | | | | | versionPTP | | | 1 | 1 |
| messageLength | | | | | | | | 2 | 2 |
| domainNumber | | | | | | | | 1 | 4 |
| Reserved | | | | | | | | 1 | 5 |
| Flags | | | | | | | | 2 | 6 |
| correctionField | | | | | | | | 8 | 8 |
| Reserved | | | | | | | | 4 | 16 |
| sourcePortIdentity | | | | | | | | 10 | 20 |
| sequenceID | | | | | | | | 2 | 30 |
| controlField | | | | | | | | 1 | 32 |
| logMessageInterval | | | | | | | | 1 | 33 |

TRANSPORTING CLIENT TIMING INFORMATION ACROSS A NETWORK

RELATED APPLICATION

This application claims priority to U.S. Provisional Patent Application No. 62/955,938, filed on Dec. 31, 2019, the content of which is incorporated by reference herein in its entirety.

BACKGROUND

Timing synchronization between devices may be important for performing financial transactions, transmitting and receiving telecommunication signals, coordinating transmission arrays, providing video over internet protocol (IP) services, and/or the like. To provide timing synchronization, one or more client devices may use precision timing protocol (PTP) to provide timing information for transport across a network.

SUMMARY

According to some implementations, a method may include receiving, by a network device of a network, a timing control packet from a first client device; determining, by the network device, that the network device is in a synchronized state relative to a network grandmaster clock; modifying, by the network device, a first field of a header of the timing control packet to indicate that the network device is in a synchronized state; modifying, by the network device, a second field of the header of the timing control packet to indicate a time at which the network device received the timing control packet from the first client device; and forwarding, by the network device and via the network, the timing control packet toward a second client device.

According to some implementations, a method may include receiving, by an egress network device of a network, a timing control packet from a second network device via the network; identifying, by the egress network device and within a first field of a header of the timing control packet, a first indication that indicates that the ingress network device was in a synchronized state when the ingress network device received the timing control packet from a first client device; identifying, by the egress network device and within a second field of the header of the timing control packet, a second indication that indicates a time at which the ingress network device received the timing control packet from the first client device; determining, by the egress network device, that the egress network device is in a synchronized state; determining, by the egress network device, a time at which the egress network device will transmit the timing control packet; determining, by the egress network device, a resident time of the timing control packet on the network based on the second indication and the time at which the egress network device will transmit the timing control packet; modifying, by the egress network device, a third field of the header of the timing control packet to indicate the resident time of the timing control packet on the network; and forwarding, by the egress network device, the timing control packet toward a second client device.

According to some implementations, a system may include an ingress network device of a network to: receive a timing control packet from a first client device; determine that the ingress network device is in a synchronized state; modify a header of the timing control packet to include: a first indication that the ingress network device is in a synchronized state; and a second indication that indicates a time at which the ingress network device received the timing control packet from the first client device; and forward the timing control packet toward an egress network device via the network; and the egress network device of the network to: receive the timing control packet via the network; identify, within the header of the timing control packet, the first indication and the second indication; determine that the egress network device is in a synchronized state; determine a resident time of the timing control packet on the network based on the second indication and a time at which the egress network device will transmit the timing control packet; modify the header of the timing control packet to indicate the resident time of the timing control packet on the network; and forward the timing control packet toward a second client device.

BRIEF DESCRIPTION OF THE DRAWINGS

FIGS. 1A-1G are diagrams of one or more example implementations described herein.

DETAILED DESCRIPTION

Figure 1A:
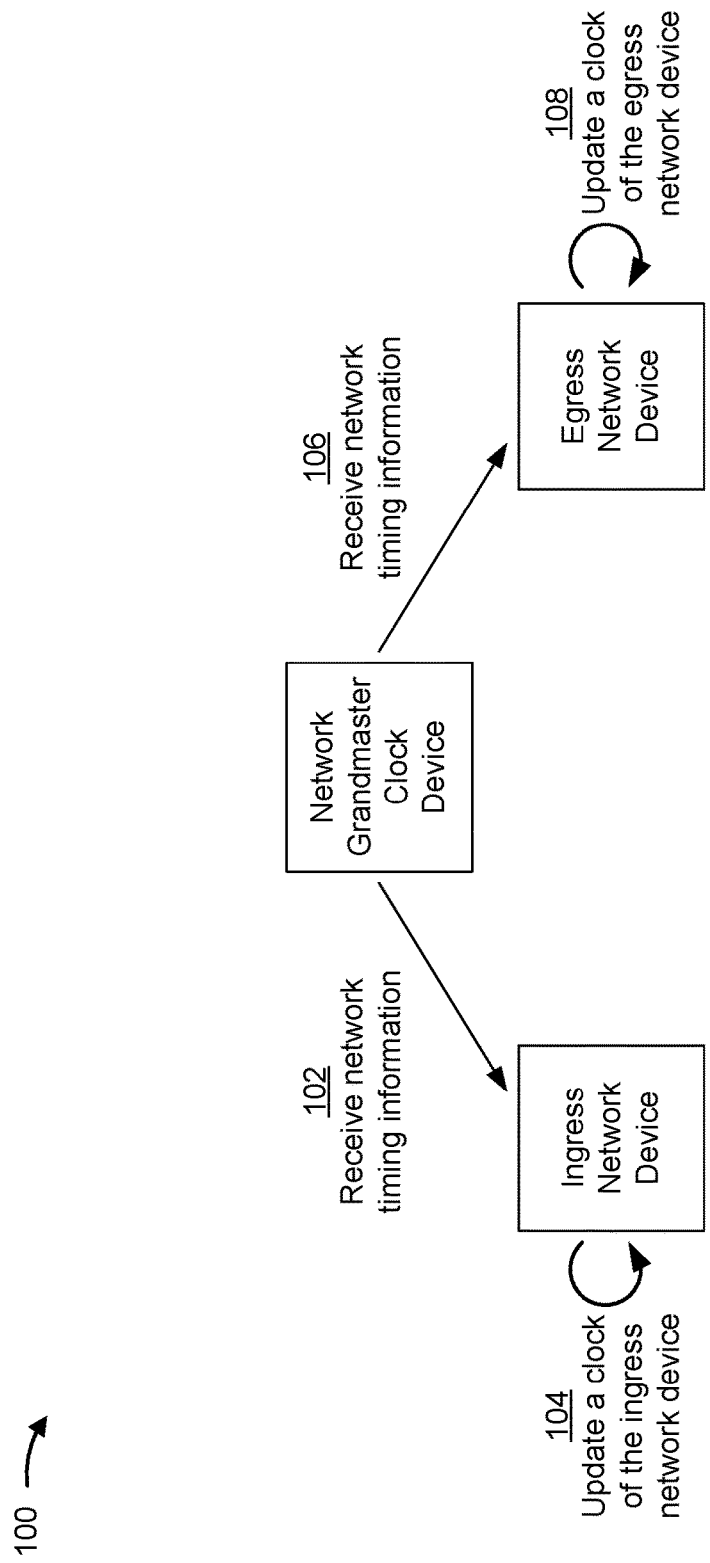

The following detailed description of example implementations refers to the accompanying drawings. The same reference numbers in different drawings may identify the same or similar elements.

Precise timing synchronization among devices may be important in many types of communications. For example, high-frequency trading operations (e.g., for trading on one or more stock markets), services provided by telecommunication networks (e.g., 5G-based or 4G-based telecommunication networks), services provided by professional broadcast television providers, and/or the like may rely on accurate timing synchronization among devices.

To provide precise timing synchronization among devices, PTP may be used. In PTP, one or more devices including grandmaster clock devices act as master timing sources to which other devices synchronize. A device, including a grandmaster clock device, receives timing information (e.g., via a global positioning system receiver, an atomic clock, and/or the like) and distributes the timing information to one or more connected devices via PTP control packets. The connected network devices may further distribute the timing information to additional devices (e.g., acting as a boundary clock or a transparent clock). For example, a transparent clock may perform corrections to the timing information that are based on amounts of time spent traversing network equipment.

Client devices that provide and/or consume timing-sensitive services may use network overlays (e.g., a cloud, multi-cloud overlay, a virtual private network, a multiprotocol label switching network, and/or the like) to communicate among the client devices (e.g., at different geo-locations). A network overlay is a virtual and/or logical network that is overlaid on a network underlay of network devices. The network underlay provides infrastructure upon which the network overlay is instantiated. The network underlay may support multiple network overlays in which client devices of the multiple network overlays are isolated (e.g., in network reachability, protocol, and/or the like) from each other and from the underlay network.

If a client device attempts to synchronize one or more other client devices across the overlay network (e.g., at different sites connected via the overlay network) by providing a timing control packet across the overlay network, the timing information may not include corrections based on amounts of time spent traversing network equipment (e.g., communication media, network devices, and/or the like) of the underlay network. This is because when a timing control packet is tunneled through one or more segments of the overlay network, the network devices in the underlay network may not parse the timing control packet to identify the timing control packet as including timing data that may need a correction. Even if networking devices are capable of parsing the timing control packet, computing and networking resources would be unnecessarily consumed at each hop of the network, and the transport service may incur unwanted delays to allow for the parsing.

The network may include one or more tunneling services, such as a multi-protocol label switching (MPLS) network, a virtual extensible local area network (VXLAN), generic network virtualization encapsulation, tunneling over IP version 6, and/or the like. If the network provides a tunneling service, data and/or control packets to be tunneled through one or more segments of the overlay network may be encapsulated with an identifier to direct the data and/or control packets through the network. Intermediate network devices may not parse the data and/or control packets beyond a tunnel header, so the intermediate network devices do not identify the encapsulated data and/or control packets by type or content. Based on failing to identify a PTP control packet as including timing information that needs a correction, the intermediate network devices may not provide the correction to the PTP control packet, which may result in the timing information being incorrect based on an error from an amount of time spent traversing the network.

Other features of networks may cause further errors in timing information sent over the network. For example, a path from a first client device to a second client device may be different than a path from the second client device to the first client device. This means that an amount of time spent traversing one path cannot be accurately determined as half of a round trip path. Additionally, even if a path from the first client device to the second client device is the same as the path from the second client device to the first client device, lengths of transmit and receive media (e.g., fiber optic cables) may be different. Every meter of difference of fiber optic cables may cause a difference in propagation time of about 5 nanoseconds. Transmission and reception media between the same two network devices may differ by 10 to thousands of meters, which may cause enough delay asymmetry to cause problems with synchronization across the network. Further, even if the traversing paths are the same and/or the lengths of transmit and receive media are the same, the transmit and receive latency within optics modules of intermediate network devices may be different and may cause latency asymmetry between paths.

According to some implementations described herein, a first network device (e.g., an ingress network device, a provider edge device, and/or the like) receives a timing control packet from a first client device. The timing control packet may be a PTP control packet intended for a second client device accessible to the first client device via the network. The first network device may parse the timing control packet to determine that the timing control packet includes client timing information. The first network device may determine whether the first network device is in a synchronized state (e.g., relative to a network grandmaster clock device). If the first network device is in a synchronized state, the first network device may modify a header of the timing control packet (e.g., within a first field) to indicate that the first network device is in a synchronized state (a first indication). The network device may also modify the header of the timing control packet to indicate a time at which the first network device received the timing control packet from the first client device (a second indication). The first network device may also modify the header of the timing control packet (e.g., within the first field or a second field) to indicate one or more attributes (e.g., a location, a quantity of bits used, and/or the like) of the second indication (a third indication). The first network device may forward the timing control packet toward the second client device via the network. The second client device may be reachable through second network device.

A second network device (e.g., an egress network device, a provider edge device, and/or the like) may receive the timing control packet from the first client device via the network. The second network device may parse the timing control packet to determine that the timing control packet includes client timing information. The second network device may identify the first indication that indicates whether the first network device was in a synchronized state and the second indication that indicates a time at which the first network device received the timing control packet from the first client device (an "ingress time"). The second network device may determine whether the second network device is in a synchronized state (e.g., relative to the network grandmaster clock). If the first indication indicates that the first network device was in a synchronized state and the second network device determines that the second network device is in a synchronized state, the second network device may determine a resident time of the timing control packet on the network. The second network device may determine the resident time based on the second indication and the time at which the second network device will transmit the timing control packet toward the second client device. The second network device may modify the header of the timing control packet (e.g., in a correction field) to indicate the resident time before forwarding the timing control packet toward the second client device.

In this way, the first client device may provide timing information across the network to the second client device without, or with a reduction of, errors caused by time spent traversing network equipment of the network. This may allow client devices to perform operations that rely on accurate timing synchronization, such as telecommunication services, IP video broadcasting, and/or the like. This may also reduce errors in communications between client devices and may reduce computing and network resources that may be used to identify and/or correct the errors in the communications.

FIGS. 1A-1G are diagrams of one or more example implementations 100 described herein. As shown in FIGS. 1A-1G, the example implementation(s) 100 may include a network grandmaster clock device, an ingress network device, an egress network device, a client grandmaster device, a first client device, a second client device, and/or the like. The network grandmaster clock device, the ingress network device, the egress network device, the client grandmaster clock device, the first client device, the second client device, and/or other included devices may comprise hardware, firmware, or a combination of hardware and software and may include, for example, switches, routers, servers, security devices, and/or the like.

The ingress network device and/or the egress network device may be part of a network that includes a plurality of network devices. The network may include an underlay network that provides infrastructure to support one or more overlay networks. For example, the underlay network may provide a data transport service (e.g., an MPLS network, VXLAN, and/or the like) to transport data packets and/or control packets between the client device and other client devices (e.g., at other physical locations). The first client device and/or the second client device may have visibility to one or more prospective connections provided by the overlay network (e.g., with other client devices accessible via the overlay network). The underlay network and/or the one or more overlay networks may be transparent (e.g., not visible) to client devices. The overlay network may provide one or more prospective connections visible to the first client device and/or the second client device via a service type such as ethernet bridging, IP routing, integrating routing and bridging, and/or the like.

The first client device and/or the second client device may include one or more devices, which may be part of a local network of client devices at a physical location (e.g., an office building). In some implementations, the first client device and/or the second client device may be physical endpoints (e.g., a device assigned to a network address) or virtual endpoints (e.g., an agent of a device that is assigned to a network address). In some implementations, the underlay network is transparent to the first client device and/or the second client device. In some implementations, the overlay network may provide one or more prospective connections visible to the first client device and/or the second client device (e.g., prospective connections with other client devices accessible via the overlay network).

As shown in FIG. 1A, and by reference number 102, the ingress network device may receive network timing information from the network grandmaster clock device. In some implementations, the ingress network device may receive the network timing information according to a precision time protocol (PTP) control packet from the network grandmaster clock device. The network may comprise one or more network grandmaster clock devices, which may be synchronized with each other. One or more additional network devices may relay the network timing information from the network grandmaster clock device to the ingress network device. The one or more additional network devices may operate as one or more transparent clocks that may perform corrections to the timing information that are based on amounts of time spent traversing network equipment between the network grandmaster clock device and the ingress network device.

As shown by reference number 104, the ingress network device may update a clock of the ingress network device based on the network timing information recovered from the network grandmaster clock device. For example, the ingress network device may use the network timing information to synchronize the ingress network device with the network grandmaster clock. In some implementations, the timing information received from the network grandmaster clock device of the network is independent from timing information received from the first client device.

As shown by reference number 106, the egress network device may also receive network timing information from the network grandmaster clock device. In some implementations, the egress network device and the ingress network device may receive the network timing information from the same network grandmaster clock device. In some implementations, the egress network device and the ingress network device may receive the network timing information from different network grandmaster clock devices of the network that are time synchronized.

As shown by reference number 108, the egress network device may update a clock of the egress network device based on the network timing information. For example, the egress network device may use the network timing information recovered from the network grand master clock to synchronize the egress network device.

In some implementation, the ingress network device and/or the egress network device may receive additional network timing information. For example, the ingress network device and/or the egress network device may receive the additional network timing information periodically (e.g., with a regular update schedule), based on requests by the ingress network device and/or the egress network device (e.g., based on a failure to update a clock based on a previously received and/or scheduled update), based on a detected synchronization error in the network, and/or the like.

Figure 1B:
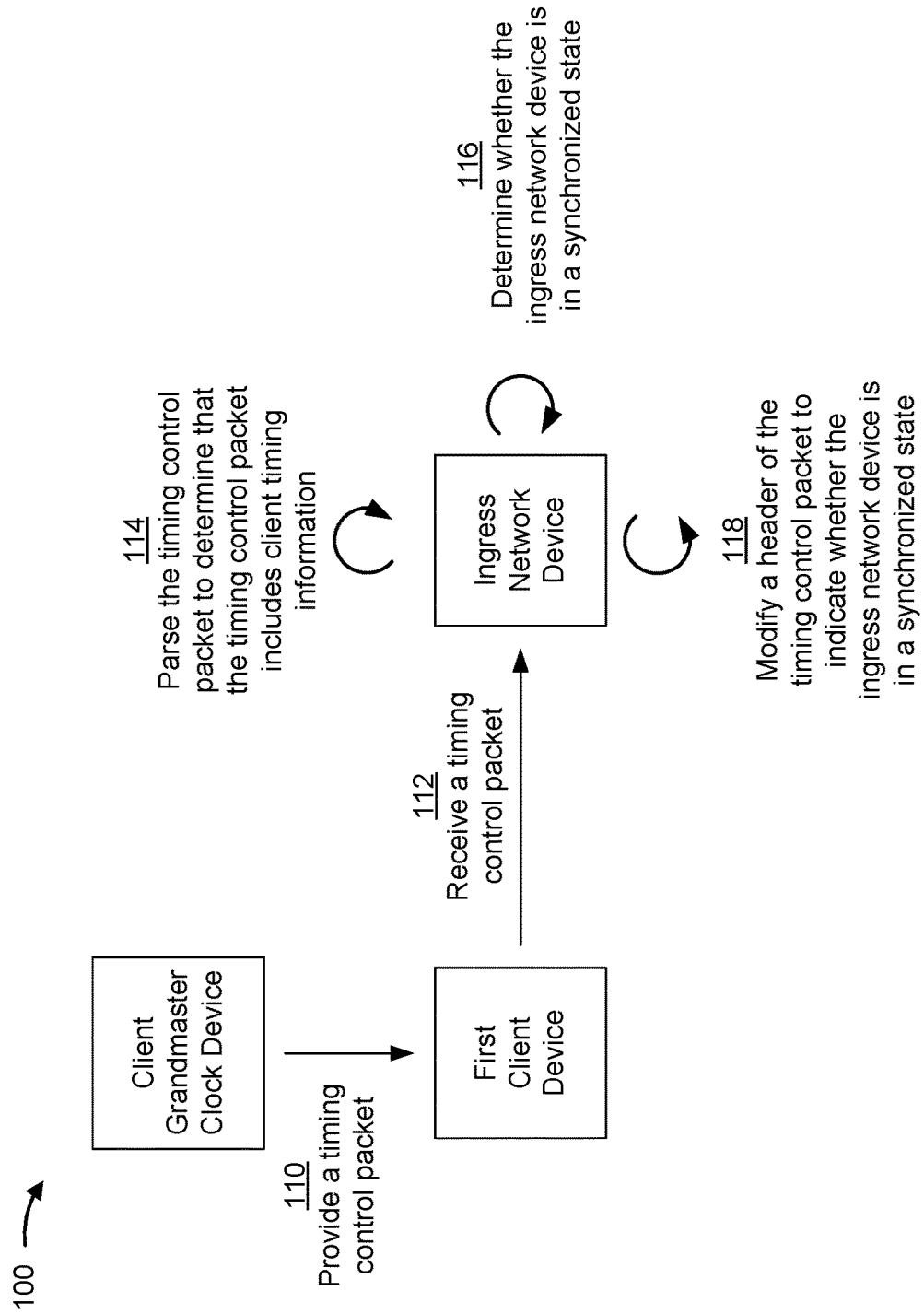

As shown in FIG. 1B, and by reference number 110, the client grandmaster clock device may provide a timing control packet to the first client device. Timing information within the timing control packet may be independent from (e.g., in a separate domain from) the network timing information. In other words, the client grandmaster clock device may not be synchronized with the network grandmaster clock, may receiving timing information from the same or different sources, and may use the same or different timing profiles to provide the timing information to connected devices.

As shown by reference number 112, the ingress network device may receive a timing control packet from the first client device. In some implementations, the timing control packet may comprise a PTP control packet. The timing control packet may indicate that the timing control packet is intended for the second client device by identifying a network address (e.g., and internet protocol (IP) address) as a destination address of the timing control packet.

In some implementations, the ingress network device may provide an interface between the first client device and the network. In other words, for the first client device to use the network as a service to transport (e.g., tunnel) the timing control packet to the second client device, the first client device provides the timing control packet to the ingress network device. The ingress network device may be configured to receive the timing control packet via one or more client-facing interfaces, prepare the timing control packet for transport over the network (e.g., by encapsulating the timing control packet, attaching a label, and/or the like), and forward the timing control packet via one or more network-facing interfaces.

As shown by reference number 114, the ingress network device may parse the timing control packet to determine that the timing control packet is a timing control packet (e.g., including the client timing information for synchronizing the second client device with the first client device). For example, the ingress network device may inspect one or more elements of a header of the timing control packet to determine that the timing control packet is a timing control packet and/or that the timing control packet includes client timing information.

As shown by reference number 116, the ingress network device may determine whether the ingress network device is in a synchronized state. In some implementations, the ingress network device may determine whether the ingress network device is in a synchronized state based on an amount of time that has passed since updating a clock based on network timing information received from the network grandmaster clock device. For example, the ingress network device may be in a synchronized state if an amount of time since a most recent update to the clock satisfies a threshold (e.g., less than a threshold amount of time). In some implementations, the ingress network device may determine that the ingress network device is in a synchronized state by testing the clock of the ingress network device against another clock in the network (e.g., the network grandmaster clock device). In some implementations, the ingress network device may determine that the ingress network device is in a synchronized state or is not in a synchronized state based on a communication from a network entity (e.g., a network controller, the network grandmaster clock device, and/or the like).

As shown by reference number 118, the ingress network device may modify the header of the timing control packet to indicate whether the ingress network device is in a synchronized state. For example, the ingress network device may modify a header of the timing control packet received from the client device, to include an indication that the ingress network device is in a synchronized state. In some implementations, the ingress network device may modify a field of a header of the timing control packet (e.g., a reserved field of the header for a PTP-based timing control packet) to indicate that the network device is in a synchronized state.

As shown in FIG. 1C, and by reference number 120, the ingress network device may modify the header to indicate a time at which the ingress network device received the timing control packet from the client device. For example, the ingress network device may modify another field of the header of the timing control packet to indicate the time (referred to in some instances as the "ingress time") at which the ingress network device received the timing control packet from the first client device or another device (e.g., a border clock device, a network device of another network along the path from the first client device to the second client device, and/or the like). In some implementations, the ingress network device may modify the header to indicate the ingress time in a field other than a correction field of the timing control packet (e.g., for a PTP-based timing control packet). This may prevent corruption of the existing correction field in cases where a resident time is not determined and/or indicated by the egress network device (e.g., if the egress network device is not in a synchronized state, if the egress network device fails to identify the timing control packet as a timing control packet, and/or the like). A corrupt correction field may cause an error by the second client device when attempting to use the timing control packet along with information stored in the correction field, to synchronize the second client device with the first client device.

As shown by reference number 122, the ingress network device may modify the header to indicate attributes associated with the indication of the time at which the ingress network device received the timing control packet. In some implementations, the attributes include indications of a location and/or a quantity of bits used to indicate the ingress time. In some implementations, the indication of the attributes may be included in a same field as the indication that the ingress network device is in a synchronized state. For example, the indication of attributes may use a first bit and a second bit of a field and the indication of synchronization state may use a third bit and a fourth bit of the same field (e.g., a 4-bit reserve field of the header (e.g., a PTP-based header)).

The indication of the attributes may indicate a field of the header that contains the indication of the ingress time (e.g., a reserve field, a correction field, and/or the like). In some implementations, the indication of the attributes may indicate a field of the header that includes 30 bits or 48 bits.

As shown by reference number 124, the ingress network device may modify the header to identify the ingress network device as the ingress network device for the timing control packet. For example, the ingress network device may modify a field of the header to include an identifier of the ingress network device. The identifier may be unique to all network devices. The identifier may be used by another entity of the network to manage timing errors reported by ingress and/or egress network devices, to generate a heat map of the network (e.g., to manage loads and/or traffic), and/or the like.

As shown by reference number 126, the ingress network device may forward the timing control packet toward the second client device and/or the egress network device via the network. Before forwarding the timing control packet, and after modifying the header, the ingress network device may prepare the timing control packet for transportation over the network (e.g., by encapsulating the timing control packet, attaching the label, and/or the like). The egress network device may receive the timing control packet via the network and prepare the timing control packet for forwarding toward the second client device (e.g., by popping a label, removing an encapsulation, and/or the like).

In some implementations, the egress network device receives the timing control packet from the ingress network device via the network as the network transports the timing control packet toward the second client device. The egress network device may provide an interface between the network and the second client device, similar to the interface provided by the ingress network device between the network and the first client device. The egress network device may receive the timing control packet and/or other packetized data from the network via one or more network-facing interfaces. When the egress network device receives the timing control packets and/or other packetized data, the egress network device may prepare the timing control packet for forwarding to the second client device (e.g., pop a label, remove an encapsulation, and/or the like).

Figure 1D:
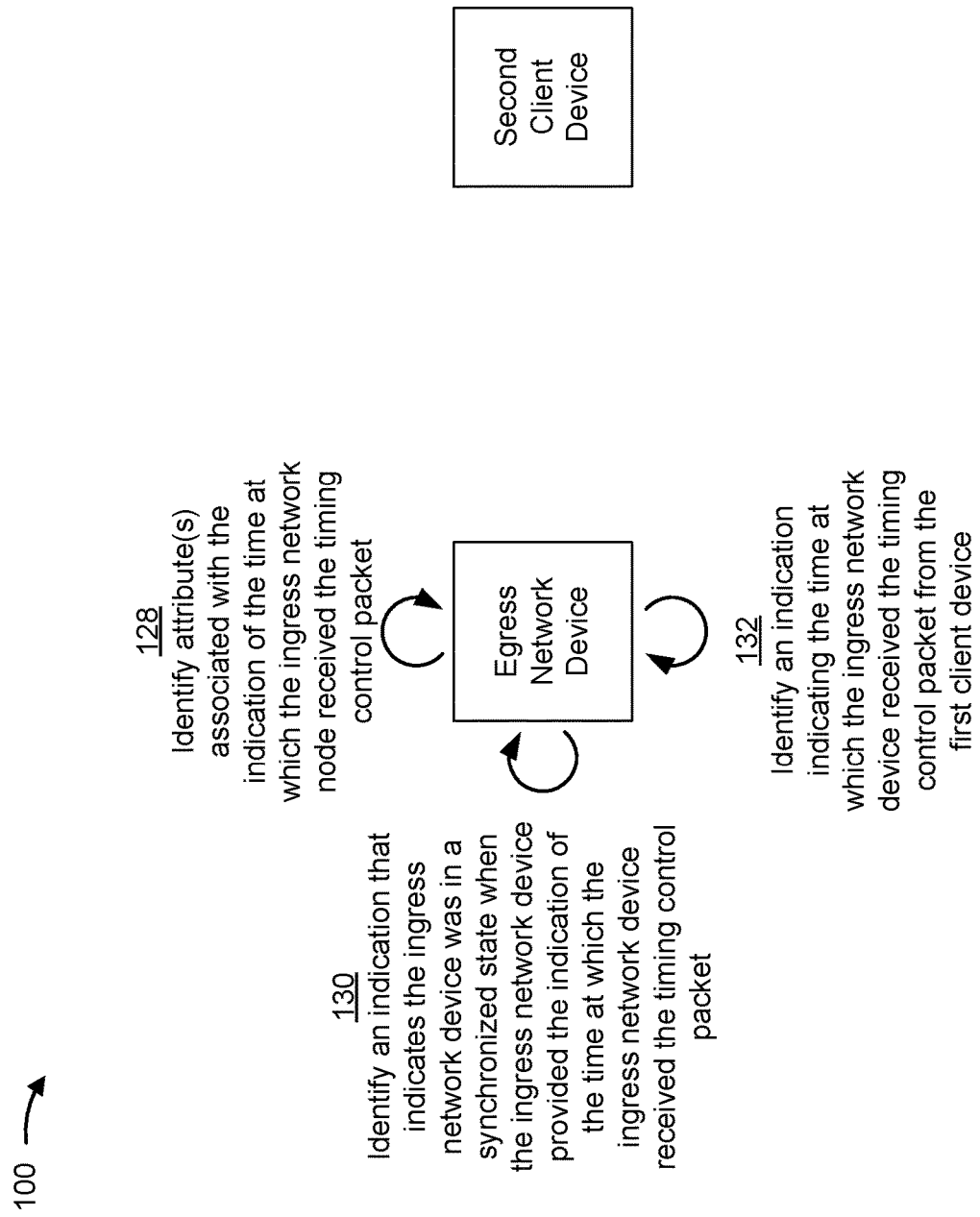

As shown in FIG. 1D, and by reference number 128, the egress network device may identify the one or more attributes associated with the indication of the time at which the ingress network device received the timing control packet. For example, the egress network device may inspect the header to identify the location and/or the quantity of bits associated with the indication of the ingress time. The egress network device may inspect the header after preparing the timing control packet for forwarding to the second client device by popping a label, removing an encapsulation, and/or the like.

As shown by reference number 130, the egress network device may identify the indication that indicates the ingress network device was in a synchronized state when the ingress network device provided the indication of the time at which the ingress network device received the timing control packet. For example, the egress network device may identify the indication within a field of the header. In some implementations, as described above, the indication of the synchronized state of the ingress network device and the indication of the one or more attributes associated with the indication of the ingress time may be within the same field of the header.

As shown by reference number 132, the egress network device may identify the indication indicating the time at which the ingress network device received the timing control packet from the first client device. For example, the egress network device may inspect a location (e.g., a field) of the header of the timing control packet to identify the indication indicating the ingress time. The egress network device may inspect the location based on a configuration of the egress network device to inspect the location, from the indication of the attributes associated with the identification of the ingress time, and/or the like.

Figure 1E:
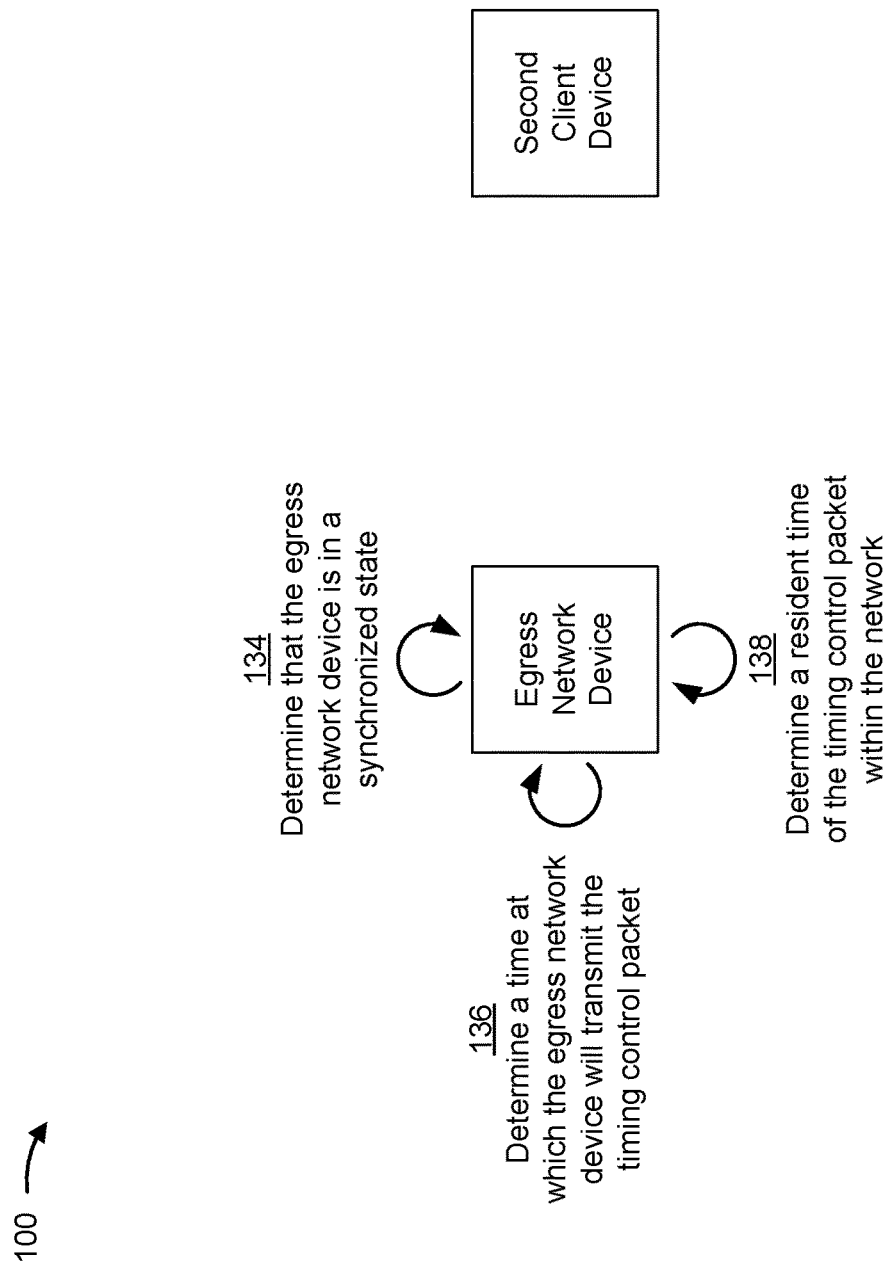

As shown in FIG. 1E, and by reference number 134, the egress network device may determine that the egress network device is in a synchronized state. In some implementations, the egress network device may determine whether the egress network device is in a synchronized state based on an amount of time that has passed since updating a clock based on network timing information received from the network grandmaster clock device. For example, the egress network device may be in a synchronized state if an amount of time since a most recent update to the clock satisfies a threshold (e.g., less than a threshold amount of time). In some implementations, the egress network device may determine that the egress network device is in a synchronized state by testing the clock of the egress network device against another clock in the network (e.g., the network grandmaster clock device). In some implementations, the egress network device may determine that the egress network device is in a synchronized state or is not in a synchronized state based on a communication from a network entity (e.g., a network controller, the network grandmaster clock device, and/or the like).

If the egress network device determines that the ingress network device was in a synchronized state when the ingress network device provided the indication of the ingress time and if the egress network device determines that the egress network device is in a synchronized state, the egress network device may use the ingress time to determine a resident time of the timing control packet.

If the egress network device determines that the ingress network device was not in a synchronized state when the ingress network device provided the indication of the ingress time, if the egress network device does not identify the indication of the ingress time, and/or if the egress network device determines that the egress network device is not in a synchronized state, the egress network device may not determine a resident time. Additionally, the egress network device may set one or more of the fields (e.g., the reserve fields and/or the correction field) to a null state (e.g., all zeros, all ones, and/or the like).

As shown by reference number 136, the egress network device may determine a time at which the egress network device will transmit the timing control packet. For example, the egress network device may determine the time at which the egress network device transmits the timing control packet based on a time at which the timing control packet reaches a port for transmission toward the second client device, a time at which the timing control packet passes through a time stamping component (e.g., an application-specific integrated circuit (ASIC)) of the egress network device, a time at which the timing control packet reaches a client attachment interface, a time at which the egress network device expects the timing control packet to exit the egress network device, a time at which the egress network device expects the timing control packet to reach a port for transmission toward the second client device, a time at which the egress network device expects the timing control packet to reach a particular component of the egress network device, and/or the like.

As shown by reference number 138, the egress network device may determine a resident time of the timing control packet within the network (e.g., terminate resident time). The egress network device may determine the resident time based on (e.g., based on a difference between) the ingress time and the time at which the egress network device will transmit the timing control packet.

As shown in FIG. 1F, and by reference number 140, the egress network device may modify the header to indicate the resident time of the timing control packet on the network. In some implementations, the egress network device may modify a field of the header (e.g. a CF field of a PTP packet header).

In this way, the timing control packet includes information to account for time spent traversing network equipment of the network. Additionally, by using the ingress time and a time at which the egress network device will transmit the timing control packet to determine the resident time, the entire network may operate as a single transparent clock. This may avoid errors in attempts to synchronize across the network that might otherwise be caused by missing corrections by network devices in the underlay network (e.g., network devices not acting as an ingress network device or an egress network device for a particular timing control packet), differing paths between client devices, differing lengths of media connecting network devices along paths between client device, differing transmitter and receiver components of network devices, and/or the like.

As shown by reference number 142, the egress network device may modify the header to remove one or more of the indications provided by the ingress network device. For example, the egress network device may, before forwarding the timing control packet toward the second client device, set fields of the header that were modified by the ingress network device to a null state (e.g., all zeros, all ones, and/or the like). In this way, a device outside of the network may use the same fields for other purposes and may avoid errors by misinterpreting the header.

As shown by reference number 144, the egress network device may forward the timing control packet toward the second client device. In some implementations, one or more intermediate devices and/or networks connect the egress network device to the second client device. The egress network device may provide the timing control packet and/or the other packetized data to the second client device via one or more client-facing interfaces after preparing the timing control packet for forwarding (e.g., popping a label, removing encapsulation, and/or the like) and modifying the header.

In this way, the network, including the ingress network device and the egress network device, may facilitate providing timing information across the network. The network may help to reduce and/or avoid errors that might otherwise be caused by missing corrections by network devices in the underlay network (e.g., network devices not acting as an ingress network device or an egress network device for a particular timing control packet (e.g., not acting as boundary clock or transparent clocks), differing paths between client devices, differing lengths of media connecting network devices along paths between client device, differing transmitter and receiver components of network devices, and/or the like.

FIG. 1G shows an example PTP message header format 146 that may be used in one or more implementations described herein. The ingress network device may use one or more of the reserved fields in the PTP message header shown. For example, the 4-bit reserve field between the messageType field and the versionPTP field may be used to indicate a time stamp type (e.g., attributes of the indication of the ingress time) and/or time stamp validity (e.g., whether the ingress network device was in a synchronized state when the ingress network device provided the indication of the ingress time). For example, the first two bits of the field may be used to indicate the time stamp type (e.g., 0 means that the indication of the ingress time is located in 30 bits of the reserve field after the correctionField, 1 means that the indication of the ingress time is located in 48 bits of the correctionField, and/or the like). The second two bits of the field may indicate the time stamp validity (e.g., 0 means that the ingress network device was not in a synchronized state, 1 means that the ingress network device was in a synchronized state, and/or the like). In some implementations, the 4-bit reserve field between the messageType field and the versionPTP field may be considered the first field of a header, as described herein, that is used to indicate whether the ingress network device is in a synchronized state when the ingress network device receives the timing control packet.

In some implementations, the 4-byte reserve field between correctionField field and sourcePortIdentity field may be used to store an ingress time stamp (e.g., the indication of the ingress time). In some implementations, the PTP message header may use a format to indicate a count of nanoseconds in the reserve field (e.g., using 30 or 32 bits). In some implementations, the 4-byte reserve field between the correctionField field and the sourcePortIdentity field may be considered the second field of a header, as described herein, that is used to indicate a time at which the ingress network device receives the timing control packet from the first client device.

In some implementations, the 1-byte reserve field between domainNumber and Flags fields may be used to store an identifier of the ingress network device. The identifier may be assigned by a network entity and may be unique for each ingress and egress network device. In some implementations, the identifier may be used for only the purpose of identifying the ingress network device for timing control packets transported over the network.

As indicated above, FIGS. 1A-1G are diagrams of one or more example implementations 100 described herein.

Figure 2:
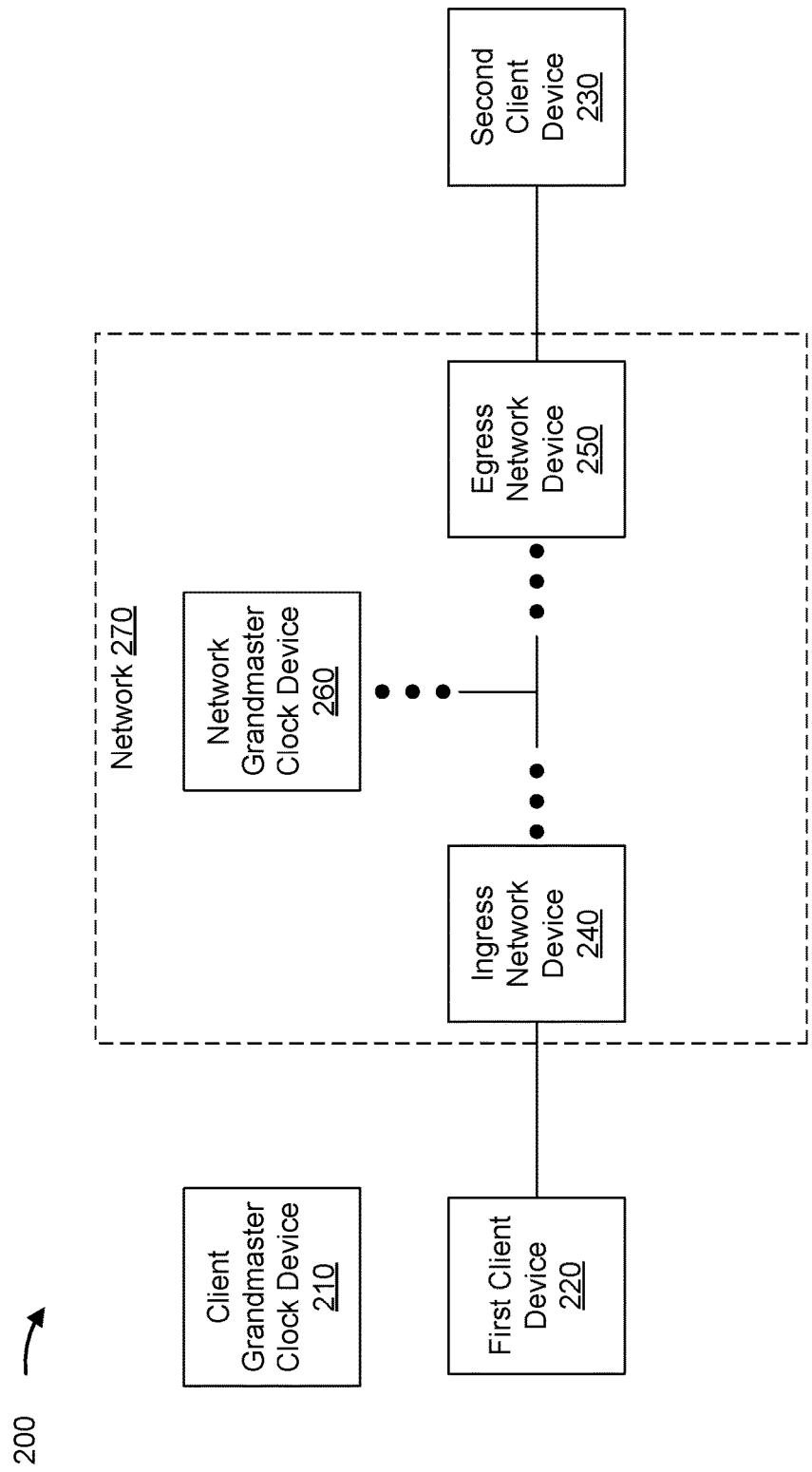
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client grandmaster clock device 210, a client grandmaster clock device 210, a first client device 220, a second client device 230, an ingress network device 240, an egress network device 250, a network grandmaster clock device 260, and a network 270. Devices of environment 200 may interconnect via wired connections, wireless connections, or a combination of wired and wireless connections.

First client device 220 includes one or more devices capable of receiving, generating, storing, processing, and/or providing information associated with communicating (e.g., timing control packets) over network 270 via ingress network device 240. For example, first client device 220 may include a communication and/or computing device, such as a customer edge device (CE device), a switch, a router, a mobile phone (e.g., a smart phone, a radiotelephone, etc.), a laptop computer, a tablet computer, a handheld computer, a desktop computer, a server, a set-top box, a gaming device, a wearable communication device (e.g., a smart wristwatch, a pair of smart eyeglasses, etc.), or a similar type of device.

Second client device 230 includes one or more devices capable of receiving, generating, storing, processing, and/or providing information associated with communicating over network 270 via egress network device 250. For example, second client device 230 may include a communication and/or computing device, such as a customer edge device (CE device), a switch, a router, a mobile phone (e.g., a smart phone, a radiotelephone, etc.), a laptop computer, a tablet computer, a handheld computer, a desktop computer, a server, a set-top box, a gaming device, a wearable communication device (e.g., a smart wristwatch, a pair of smart eyeglasses, etc.), or a similar type of device.

Ingress network device 240 includes one or more devices capable of receiving, storing, generating, processing, forwarding, and/or transferring information. For example, ingress network device 240 may include a router, a switch (e.g., a top-of-rack (TOR) switch), a gateway, a firewall device, a modem, a hub, a bridge, a network interface controller (MC), a reverse proxy, a server (e.g., a proxy server), a multiplexer, a security device, an intrusion detection device, a load balancer, or a similar device. In some implementations, ingress network device 240 may be a physical device implemented within a housing, such as a chassis. In some implementations, ingress network device 240 may be a virtual device implemented by one or more computer devices of a cloud computing environment or a data center. In some implementations, ingress network device 240 may provide one or more interfaces between network 270 and a client device (e.g., first client device 220). In some implementations, ingress network device 240 may forward timing control packets from first client device 220 to second client device 230 via one or more hops of network 270. In some implementations, ingress network device 240 may perform as an egress network device (e.g., for packetized data provided to first client device 220 via network 270).

Egress network device 250 includes one or more devices capable of receiving, storing, generating, processing, forwarding, and/or transferring information. For example, egress network device 250 may include a router, a switch (e.g., a top-of-rack (TOR) switch), a gateway, a firewall device, a modem, a hub, a bridge, a network interface controller (MC), a reverse proxy, a server (e.g., a proxy server), a multiplexer, a security device, an intrusion detection device, a load balancer, or a similar device. In some implementations, egress network device 250 may be a physical device implemented within a housing, such as a chassis. In some implementations, egress network device 250 may be a virtual device implemented by one or more computer devices of a cloud computing environment or a data center. In some implementations, egress network device 250 may provide one or more interfaces between network 270 and a client device (e.g., second client device 230). In some implementations, egress network device 250 may receive timing control packets from first client device 220 intended for second client device 230 via one or more hops of network 270. In some implementations, egress network device 250 may perform as an ingress network device (e.g., for packetized data received from second client device 230 via network 270).

Network grandmaster clock device 260 may include one or more devices capable of receiving, generating, storing, processing, and/or providing information associated with timing information. In some implementations, network grandmaster clock device 260 may receive timing information for the network from one or more of a global positioning system receiver, an atomic clock, another device that receives timing information from a timing source, and/or the like.

Network 270 includes one or more wired and/or wireless networks. For example, network 270 may include a network of devices to provide one or more tunneling services, such as a multi-protocol label switching (MPLS) network, a virtual extensible local area network (VXLAN), generic network virtualization encapsulation, tunneling over IP version 6, and/or the like. Network 270 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
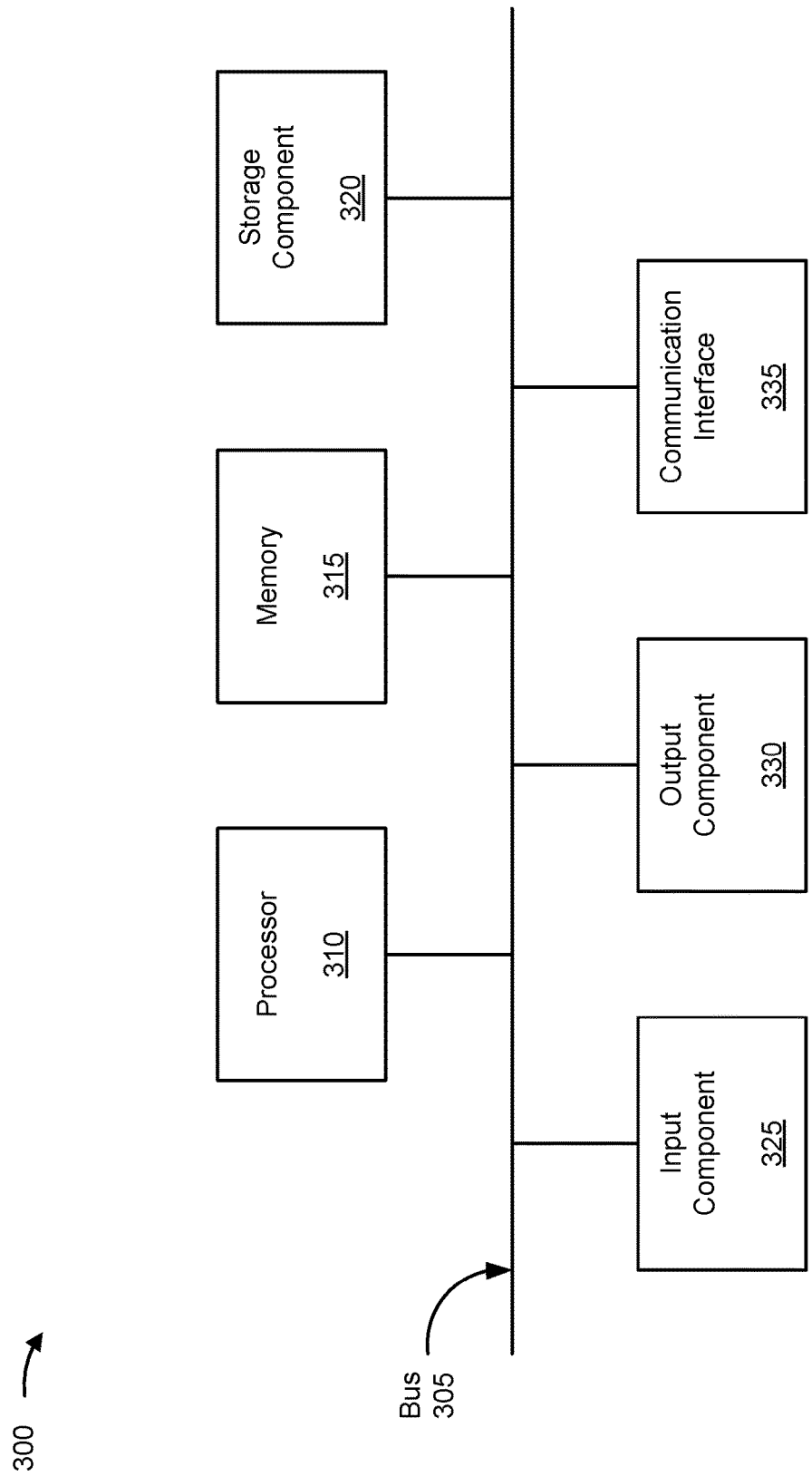
FIGS. 3A-3B are diagrams of example components of one or more devices of FIG. 2.

FIG. 3A is a diagram of example components of a device 300. Device 300 may correspond to client grandmaster clock device 210, first client device 220, second client device 230, ingress network device 240, egress network device 250, and/or network grandmaster clock device 260. In some implementations, client grandmaster clock device 210, first client device 220, second client device 230, ingress network device 240, egress network device 250, and/or network grandmaster clock device 260 may include one or more devices 300 and/or one or more components of device 300. As shown in FIG. 3, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
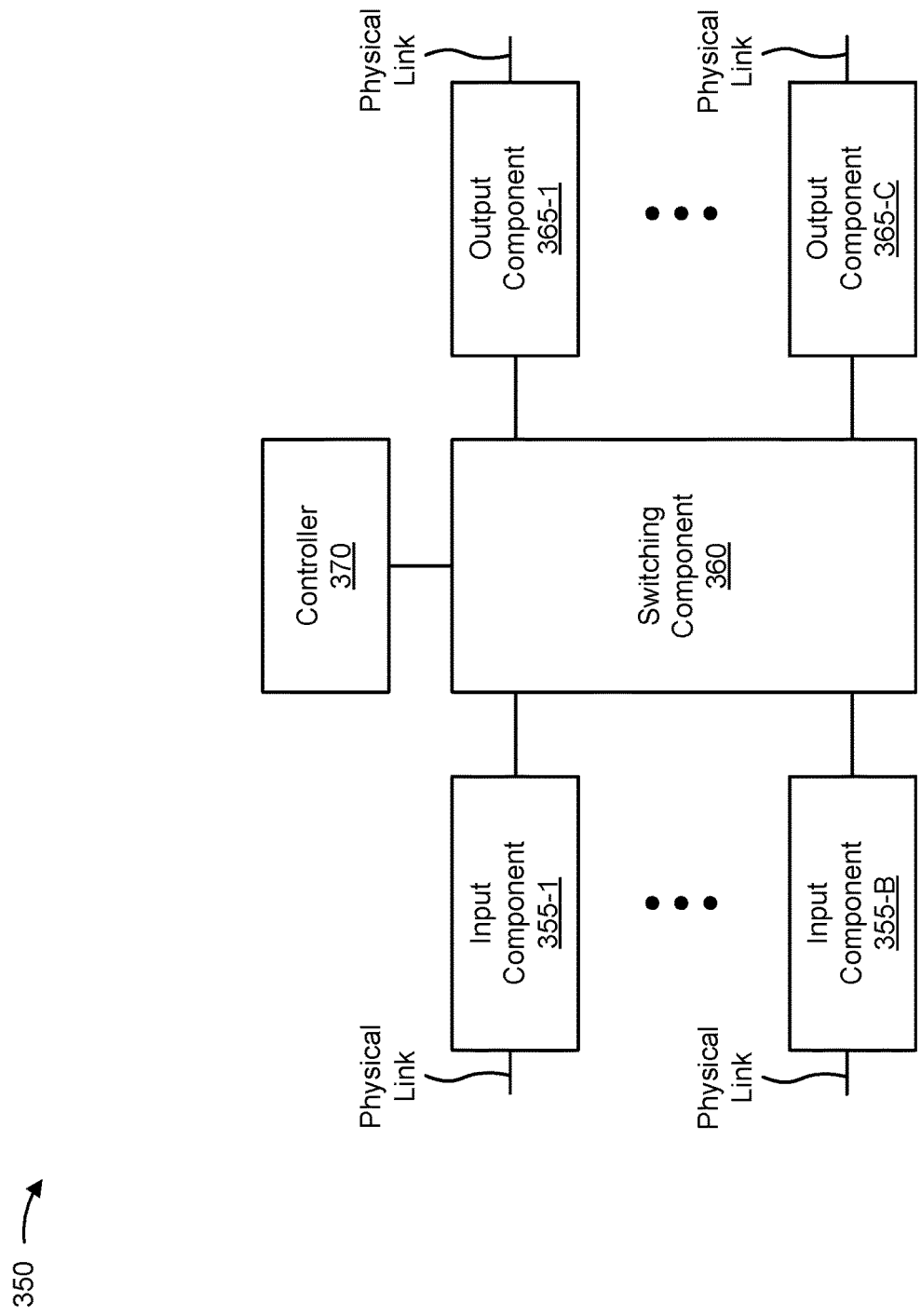

FIG. 3B is a diagram of example components of a device 350. Device 350 may correspond to client grandmaster clock device 210, first client device 220, second client device 230, ingress network device 240, egress network device 250, and/or network grandmaster clock device 260. In some implementations, one or more of client grandmaster clock device 210, first client device 220, second client device 230, ingress network device 240, egress network device 250, and/or network grandmaster clock device 260 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C(C≥1) (hereinafter referred to collectively as output components 365, and individually as output component 365), and a controller 370.

Input components 355 may be points of attachment for physical links and may be points of entry for incoming traffic, such as packets. Input components 355 may process incoming traffic, such as by performing data link layer encapsulation or decapsulation. In some implementations, input components 355 may send and/or receive packets. In some implementations, input components 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
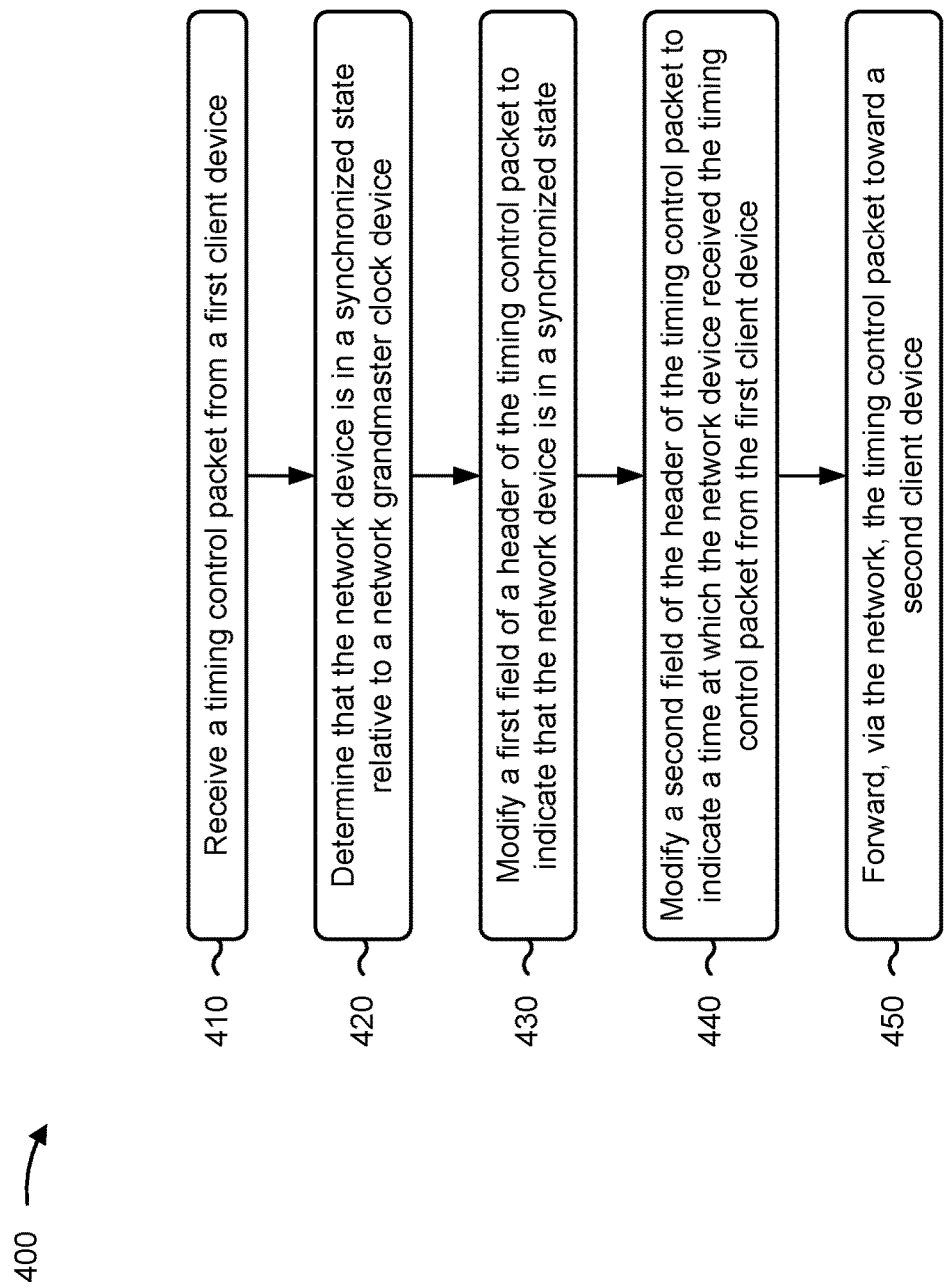
FIGS. 4-6 are flowcharts of example processes for transporting client timing information across a network.

FIG. 4 is a flow chart of an example process 400 for transporting client timing information across a network. In some implementations, one or more process blocks of FIG. 4 may be performed by an ingress network device (e.g., ingress network device 240). In some implementations, one or more process blocks of FIG. 4 may be performed by another device or a group of devices separate from or including the ingress network device, such as a client grandmaster clock device (e.g., client grandmaster clock device 210), a first client device (e.g., first client device 220), a second client device (e.g., second client device 230), another ingress network device, an egress network device (e.g., egress network device 250), a network grandmaster clock device (e.g., network grandmaster clock device 260), and/or the like.

As shown in FIG. 4, process 400 may include receiving a timing control packet from a first client device (block 410). For example, the network device (e.g., using processor 310, memory 315, storage component 320, input component 325, output component 330, communication interface 335, switching component 360, controller 370, and/or the like) may receive a timing control packet from a first client device, as described above.

As further shown in FIG. 4, process 400 may include determining that the network device is in a synchronized state relative to a network grandmaster clock (block 420). For example, the network device (e.g., using processor 310, memory 315, storage component 320, input component 325, output component 330, communication interface 335, switching component 360, controller 370, and/or the like) may determine that the network device is in a synchronized state relative to a network grandmaster clock, as described above.

As further shown in FIG. 4, process 400 may include modifying a first field of a header of the timing control packet to indicate that the network device is in a synchronized state (block 430). For example, the network device (e.g., using processor 310, memory 315, storage component 320, input component 325, output component 330, communication interface 335, switching component 360, controller 370, and/or the like) may modify a first field of a header of the timing control packet to indicate that the network device is in a synchronized state, as described above.

As further shown in FIG. 4, process 400 may include modifying a second field of the header of the timing control packet to indicate a time at which the network device received the timing control packet from the first client device (block 440). For example, the network device (e.g., using processor 310, memory 315, storage component 320, input component 325, output component 330, communication interface 335, switching component 360, controller 370, and/or the like) may modify a second field of the header of the timing control packet to indicate a time at which the network device received the timing control packet from the first client device, as described above.

As further shown in FIG. 4, process 400 may include forwarding, via the network, the timing control packet toward a second client device (block 450). For example, the network device (e.g., using processor 310, memory 315, storage component 320, input component 325, output component 330, communication interface 335, switching component 360, controller 370, and/or the like) may forward, via the network, the timing control packet toward a second client device, as described above.

Process 400 may include additional implementations, such as any single implementation or any combination of implementations described below and/or in connection with one or more other processes described elsewhere herein.

In a first implementation, the first field comprises a first portion and a second portion, wherein the first portion includes a first indication that the network device is in the synchronized state, and wherein the second portion includes a second indication of one or more attributes of the second field.

In a second implementation, alone or in combination with the first implementation, the one or more attributes include a location of the second field within the header of the timing control packet or include a quantity of bits associated with the second field.

In a third implementation, alone or in combination with one or more of the first and second implementations, the timing control packet comprises a precision time protocol control packet.

In a fourth implementation, alone or in combination with one or more of the first through third implementations, process 400 includes parsing the timing control packet to determine that the timing control packet includes client timing information for synchronizing the second client device with the first client device, wherein the network device is determining whether the network device is in the synchronized state based on determining that the timing control packet includes the client timing information.

In a fifth implementation, alone or in combination with one or more of the first through fourth implementations, process 400 includes receiving, from the network grandmaster clock, network timing information to synchronize the network device with the network grandmaster clock; and updating a clock of the network device based on the network timing information, wherein the network device is determining that the network device is in the synchronized state based on updating the clock of the network device.

In a sixth implementation, alone or in combination with one or more of the first through fifth implementations, process 400 includes modifying a third field of the header of the timing control packet to identify the network device as an ingress network device for the timing control packet.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
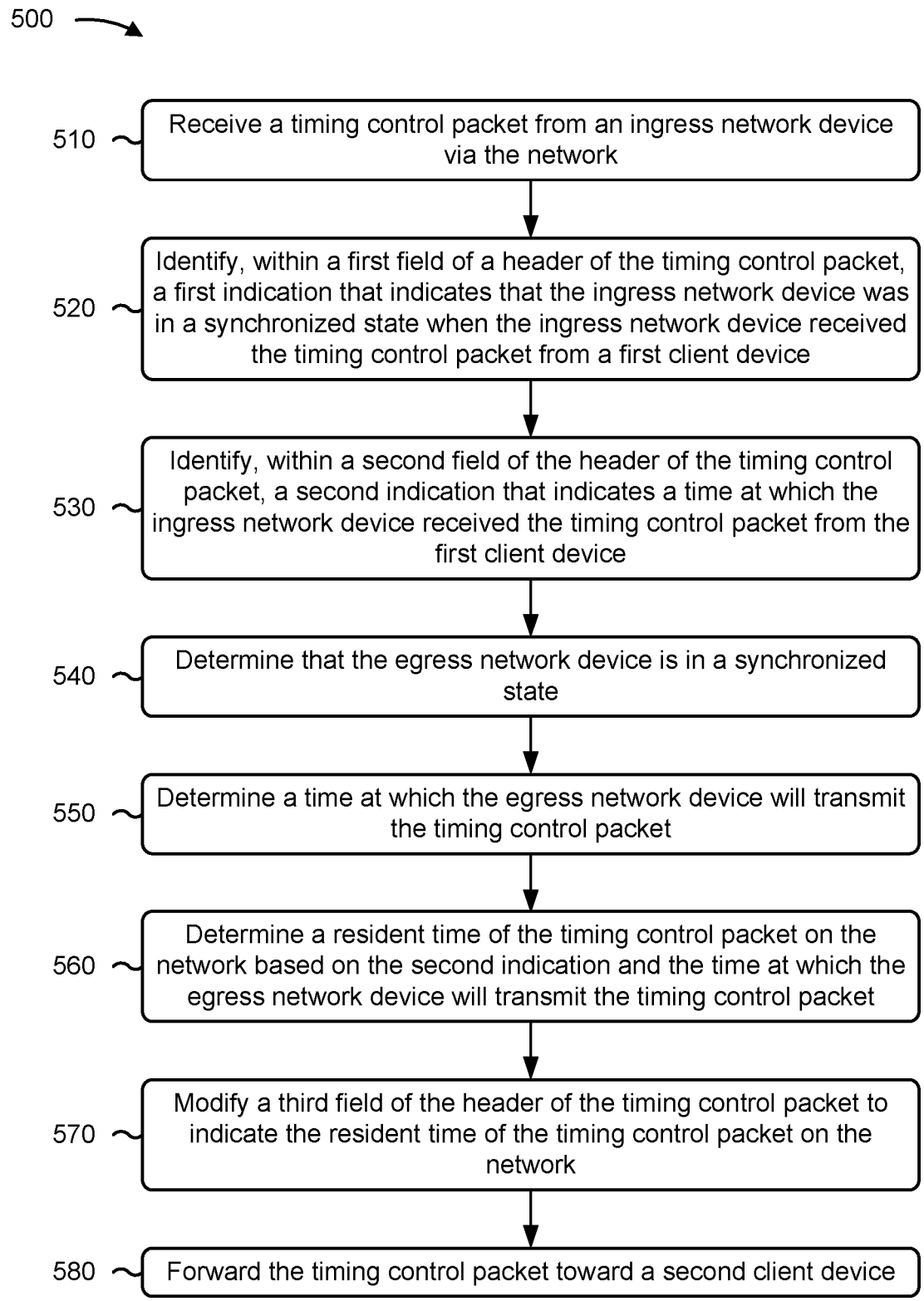

FIG. 5 is a flow chart of an example process 500 for transporting client timing information across a network. In some implementations, one or more process blocks of FIG. 5 may be performed by an egress network device (e.g., egress network device 250). In some implementations, one or more process blocks of FIG. 5 may be performed by another device or a group of devices separate from or including the network device, such as a client grandmaster clock device (e.g., client grandmaster clock device 210), a first client device (e.g., first client device 220), a second client device (e.g., second client device 230), another egress network device, an ingress network device (e.g., ingress network device 240), a network grandmaster clock device (e.g., network grandmaster clock device 260), and/or the like.

As shown in FIG. 5, process 500 may include receiving a timing control packet from an ingress network device via the network (block 510). For example, the egress network device (e.g., using processor 310, memory 315, storage component 320, input component 325, output component 330, communication interface 335, switching component 360, controller 370, and/or the like) may receive a timing control packet from an ingress network device via the network, as described above. Needs modification on FIG. 5 and related description based on that.

As further shown in FIG. 5, process 500 may include identifying, within a first field of a header of the timing control packet, a first indication that indicates that the ingress network device was in a synchronized state when the ingress network device received the timing control packet from a first client device (block 520). For example, the egress network device (e.g., using processor 310, memory 315, storage component 320, input component 325, output component 330, communication interface 335, switching component 360, controller 370, and/or the like) may identify, within a first field of a header of the timing control packet, a first indication that indicates that the ingress network device was in a synchronized state when the ingress network device received the timing control packet from a first client device, as described above.

As further shown in FIG. 5, process 500 may include identifying, within a second field of the header of the timing control packet, a second indication that indicates a time at which the ingress network device received the timing control packet from the first client device (block 530). For example, the egress network device (e.g., using processor 310, memory 315, storage component 320, input component 325, output component 330, communication interface 335, switching component 360, controller 370, and/or the like) may identify, within a second field of the header of the timing control packet, a second indication that indicates a time at which the ingress network device received the timing control packet from the first client device, as described above.

As further shown in FIG. 5, process 500 may include determining that the egress network device is in a synchronized state (block 540). For example, the egress network device (e.g., using processor 310, memory 315, storage component 320, input component 325, output component 330, communication interface 335, switching component 360, controller 370, and/or the like) may determine that the egress network device is in a synchronized state, as described above.

As further shown in FIG. 5, process 500 may include determining a time at which the egress network device received the timing control packet (block 550). For example, the egress network device (e.g., using processor 310, memory 315, storage component 320, input component 325, output component 330, communication interface 335, switching component 360, controller 370, and/or the like) may determine a time at which the egress network device received the timing control packet, as described above.

As further shown in FIG. 5, process 500 may include determining a resident time of the timing control packet on the network based on the second indication and the time at which the egress network device will transmit the timing control packet (block 560). For example, the egress network device (e.g., using processor 310, memory 315, storage component 320, input component 325, output component 330, communication interface 335, switching component 360, controller 370, and/or the like) may determine a resident time of the timing control packet on the network based on the second indication and the time at which the egress network device will transmit the timing control packet, as described above.

As further shown in FIG. 5, process 500 may include modifying a third field of the header of the timing control packet to indicate the resident time of the timing control packet on the network (block 570). For example, the egress network device (e.g., using processor 310, memory 315, storage component 320, input component 325, output component 330, communication interface 335, switching component 360, controller 370, and/or the like) may modify a third field of the header of the timing control packet to indicate the resident time of the timing control packet on the network, as described above.

As further shown in FIG. 5, process 500 may include forwarding the timing control packet toward a second client device (block 580). For example, the egress network device (e.g., using processor 310, memory 315, storage component 320, input component 325, output component 330, communication interface 335, switching component 360, controller 370, and/or the like) may forward the timing control packet toward a second client device, as described above.

Process 500 may include additional implementations, such as any single implementation or any combination of implementations described below and/or in connection with one or more other processes described elsewhere herein.

In a first implementation, the first field comprises a first portion and a second portion, wherein the first portion indicates that the ingress network device was in the synchronized state, and wherein the second portion indicates a location of the second field within the header of the timing control packet or indicates a quantity of bits associated with the second field.

In a second implementation, alone or in combination with the first implementation, process 500 includes receiving, from a network grandmaster clock, network timing information to synchronize the egress network device with the network grandmaster clock; and updating a clock of the ingress network device based on the network timing information, wherein the egress network device is determining that the egress network device is in the synchronized state based on updating the clock of the egress network device.

In a third implementation, alone or in combination with one or more of the first and second implementations, the network comprises a multi-protocol label switching network.

In a fourth implementation, alone or in combination with one or more of the first through third implementations, the egress network device provides an interface between the client device and the network, and wherein the ingress network device provides an interface between the network and another client device.

In a fifth implementation, alone or in combination with one or more of the first through fourth implementations, process 500 includes, before forwarding the timing control packet toward the client device, setting the first field and the second field to a null state.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
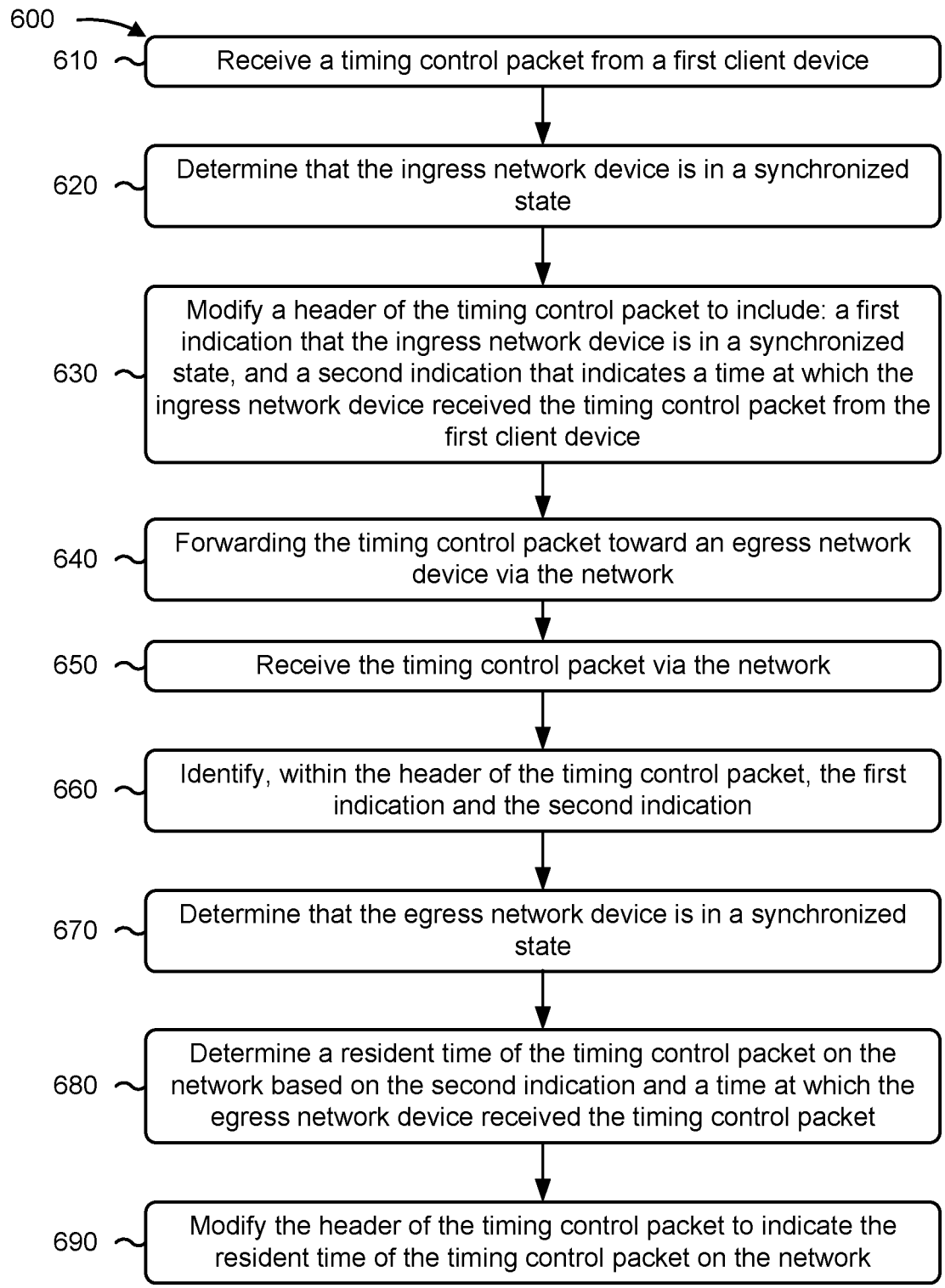

FIG. 6 is a flow chart of an example process 600 for transporting client timing information across a network. In some implementations, one or more process blocks of FIG. 6 may be performed by a system comprising an ingress network device (e.g., ingress network device 240) and an egress network device (e.g., egress network device 250). In some implementations, one or more process blocks of FIG. 6 may be performed by another device or a group of devices separate from or including the network device, such as a client grandmaster clock device (e.g., client grandmaster clock device 210), a first client device (e.g., first client device 220), a second client device (e.g., second client device 230), another ingress network device, an egress network device (e.g., egress network device 250), a network grandmaster clock device (e.g., network grandmaster clock device 260), and/or the like.

As shown in FIG. 6, process 600 may include receiving a timing control packet from a first client device (block 610). For example, the ingress network device (e.g., using processor 310, memory 315, storage component 320, input component 325, output component 330, communication interface 335, switching component 360, controller 370, and/or the like) may receive a timing control packet from a first client device, as described above.

As further shown in FIG. 6, process 600 may include determining that the ingress network device is in a synchronized state (block 620). For example, the ingress network device (e.g., using processor 310, memory 315, storage component 320, input component 325, output component 330, communication interface 335, switching component 360, controller 370, and/or the like) may determine that the ingress network device is in a synchronized state, as described above.

As further shown in FIG. 6, process 600 may include modifying a header of the timing control packet to include a first indication that the ingress network device is in a synchronized state, and a second indication that indicates a time at which the ingress network device received the timing control packet from the first client device (block 630). For example, the ingress network device (e.g., using processor 310, memory 315, storage component 320, input component 325, output component 330, communication interface 335, switching component 360, controller 370, and/or the like) may modify a header of the timing control packet to include, as described above.

As further shown in FIG. 6, process 600 may include forwarding the timing control packet toward an egress network device via the network (block 640). For example, the ingress network device (e.g., using processor 310, memory 315, storage component 320, input component 325, output component 330, communication interface 335, switching component 360, controller 370, and/or the like) may forward the timing control packet toward an egress network device via the network, as described above.

As further shown in FIG. 6, process 600 may include receiving the timing control packet via the network (block 650). For example, the egress network device (e.g., using processor 310, memory 315, storage component 320, input component 325, output component 330, communication interface 335, switching component 360, controller 370, and/or the like) may receive the timing control packet via the network, as described above.

As further shown in FIG. 6, process 600 may include identifying, within the header of the timing control packet, the first indication and the second indication (block 660). For example, the egress network device (e.g., using processor 310, memory 315, storage component 320, input component 325, output component 330, communication interface 335, switching component 360, controller 370, and/or the like) may identify, within the header of the timing control packet, the first indication and the second indication, as described above.

As further shown in FIG. 6, process 600 may include determining that the egress network device is in a synchronized state (block 670). For example, the egress network device (e.g., using processor 310, memory 315, storage component 320, input component 325, output component 330, communication interface 335, switching component 360, controller 370, and/or the like) may determine that the egress network device is in a synchronized state, as described above.

As further shown in FIG. 6, process 600 may include determining a resident time of the timing control packet on the network based on the second indication and a time at which the egress network device received the timing control packet (block 680). For example, the egress network device (e.g., using processor 310, memory 315, storage component 320, input component 325, output component 330, communication interface 335, switching component 360, controller 370, and/or the like) may determine a resident time of the timing control packet on the network based on the second indication and a time at which the egress network device received the timing control packet, as described above.

As further shown in FIG. 6, process 600 may include modifying the header of the timing control packet to indicate the resident time of the timing control packet on the network (block 690). For example, the egress network device (e.g., using processor 310, memory 315, storage component 320, input component 325, output component 330, communication interface 335, switching component 360, controller 370, and/or the like) may modify the header of the timing control packet to indicate the resident time of the timing control packet on the network, as described above.

Process 600 may include additional implementations, such as any single implementation or any combination of implementations described below and/or in connection with one or more other processes described elsewhere herein.

In a first implementation, the ingress network device is further to modify the header of the timing control packet to indicate one or more attributes of the header.

In a second implementation, alone or in combination with the first implementation, the one or more attributes include a location of the second indication within the header of the timing control packet or include a quantity of bits associated with the second indication.

In a third implementation, alone or in combination with one or more of the first and second implementations, the timing control packet comprises a precision time protocol control packet.

In a fourth implementation, alone or in combination with one or more of the first through third implementations, the ingress network device is further to parse the timing control packet to determine that the timing control packet includes client timing information for synchronizing the second client device with the first client device, wherein the ingress network device initiates a determination of whether the ingress network device is in the synchronized state based on determining that the timing control packet includes the client timing information.

In a fifth implementation, alone or in combination with one or more of the first through fourth implementations, the ingress network device is further to modify the header of the timing control packet to identify the ingress network device as the ingress network device for the timing control packet.

In a sixth implementation, alone or in combination with one or more of the first through fifth implementations, the ingress network device provides an interface between the first client device and the network, and wherein the egress network device provides an interface between the second client device and the network.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device of a network, a timing control packet from a first client device;
   determining, by the network device, that the network device is in a synchronized state relative to a network grandmaster clock;
   modifying, by the network device, a first field of a header of the timing control packet to indicate that the network device is in the synchronized state;
   modifying, by the network device, a second field of the header of the timing control packet to indicate a time at which the network device received the timing control packet from the first client device; and
   forwarding, by the network device and via the network, the timing control packet toward a second client device.

2. The method of claim 1, wherein the first field comprises a first portion and a second portion,
   wherein the first portion includes a first indication that the network device is in the synchronized state, and
   wherein the second portion includes a second indication of one or more attributes of the second field.

3. The method of claim 2, wherein the one or more attributes include a location of the second field within the header of the timing control packet or include a quantity of bits associated with the second field.

4. The method of claim 1, wherein the timing control packet comprises a precision time protocol control packet.

5. The method of claim 1, further comprising:
   parsing the timing control packet to determine that the timing control packet includes client timing information for synchronizing the second client device with the first client device,
      wherein the network device determines whether the network device is in the synchronized state based on determining that the timing control packet includes the client timing information.

6. The method of claim 1, further comprising:
   receiving, from the network grandmaster clock, network timing information to synchronize the network device with the network grandmaster clock; and
   updating a clock of the network device based on the network timing information,
      wherein the network device determines that the network device is in the synchronized state based on updating the clock of the network device.

7. The method of claim 1, further comprising:
   modifying a third field of the header of the timing control packet to identify the network device as an ingress network device for the timing control packet.

8. A method, comprising:
   receiving, by an egress network device of a network, a timing control packet from an ingress network device via the network;
   identifying, by the egress network device and within a first field of a header of the timing control packet, a first indication that indicates that the ingress network device was in a synchronized state when the ingress network device received the timing control packet from a first client device;
   identifying, by the egress network device and within a second field of the header of the timing control packet, a second indication that indicates a time at which the ingress network device received the timing control packet from the first client device;
   determining, by the egress network device, that the ingress network device is in the synchronized state;
   determining, by the egress network device, a time at which the egress network device will transmit the timing control packet;
   determining, by the egress network device, a resident time of the timing control packet on the network based on the second indication and the time at which the egress network device will transmit the timing control packet;
   modifying, by the egress network device, a third field of the header of the timing control packet to indicate the resident time of the timing control packet on the network; and
   forwarding, by the egress network device, the timing control packet toward a second client device.

9. The method of claim 8, wherein the first field comprises a first portion and a second portion,
   wherein the first portion indicates that the ingress network device was in the synchronized state, and
   wherein the second portion indicates a location of the second field within the header of the timing control packet or indicates a quantity of bits associated with the second field.

10. The method of claim 8, wherein the synchronized state is a first synchronized state; and
   the method further comprising:
      receiving, from a network grandmaster clock, network timing information to synchronize the egress network device with the network grandmaster clock; and updating a clock of the ingress network device based on the network timing information, wherein the egress network device determines that the egress network device is in a second synchronized state based on updating the clock of the egress network device.

11. The method of claim 8, wherein the network comprises a multi-protocol label switching network.

12. The method of claim 8, wherein the egress network device provides an interface between the second client device and the network, and wherein the ingress network device provides an interface between the network and the first client device.

13. The method of claim 8, further comprising, before forwarding the timing control packet toward the second client device, setting the first field and the second field to a null state.

14. A system comprising:
an ingress network device of a network to:
receive a timing control packet from a first client device;
determine that the ingress network device is in a first synchronized state;
modify a header of the timing control packet to include:
a first indication that the ingress network device is in the first synchronized state; and
a second indication that indicates a time at which the ingress network device received the timing control packet from the first client device; and
forward the timing control packet toward an egress network device via the network; and
the egress network device of the network to:
receive the timing control packet via the network;
identify, within the header of the timing control packet, the first indication and the second indication;
determine that the egress network device is in a second synchronized state;
determine a resident time of the timing control packet on the network based on the second indication and a time at which the egress network device will transmit the timing control packet;
modify the header of the timing control packet to indicate the resident time of the timing control packet on the network; and
forward the timing control packet toward a second client device.

15. The system of claim 14, wherein the ingress network device is further to modify the header of the timing control packet to indicate one or more attributes of the header.

16. The system of claim 15, wherein the one or more attributes include a location of the second indication within the header of the timing control packet or include a quantity of bits associated with the second indication.

17. The system of claim 14, wherein the timing control packet comprises a precision time protocol control packet.

18. The system of claim 14, wherein the ingress network device is further to:
parse the timing control packet to determine that the timing control packet includes client timing information for synchronizing the second client device with the first client device,
wherein the ingress network device initiates a determination of whether the ingress network device is in the first synchronized state based on determining that the timing control packet includes the client timing information.

19. The system of claim 14, wherein the ingress network device is further to:
modify the header of the timing control packet to identify the ingress network device as the ingress network device for the timing control packet.

20. The system of claim 14, wherein the ingress network device provides an interface between the first client device and the network, and
wherein the egress network device provides an interface between the second client device and the network.

\* \* \* \* \*